Jan. 8, 1929.
J. HARRIS
BLOWPIPE
1,698,094
Filed May 4, 1925   2 Sheets-Sheet 1
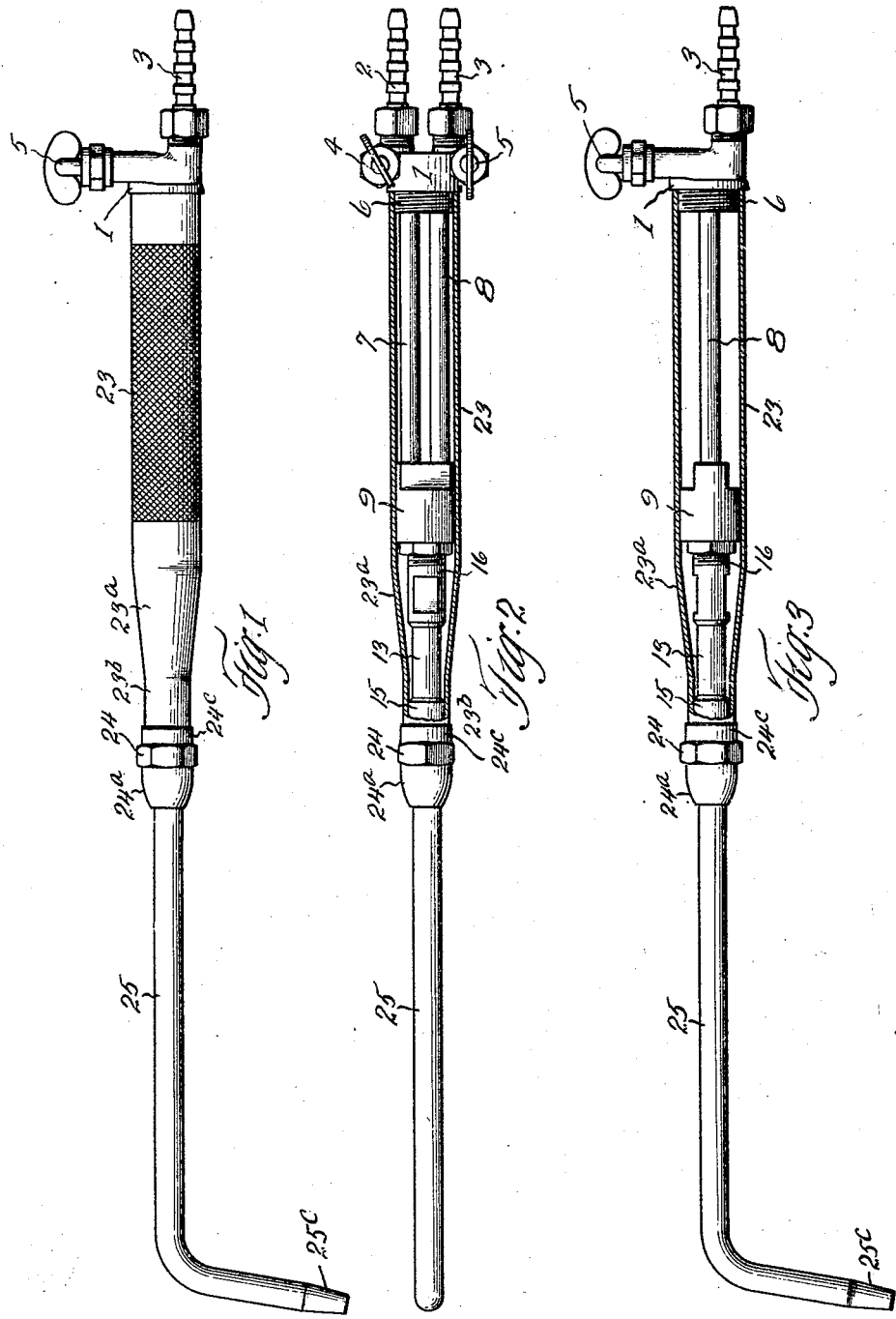
Inventor
John Harris,
By Hull, Buck & West
Attys.

Jan. 8, 1929.
J. HARRIS
BLOWPIPE
Filed May 4, 1925
1,698,094
2 Sheets-Sheet 2
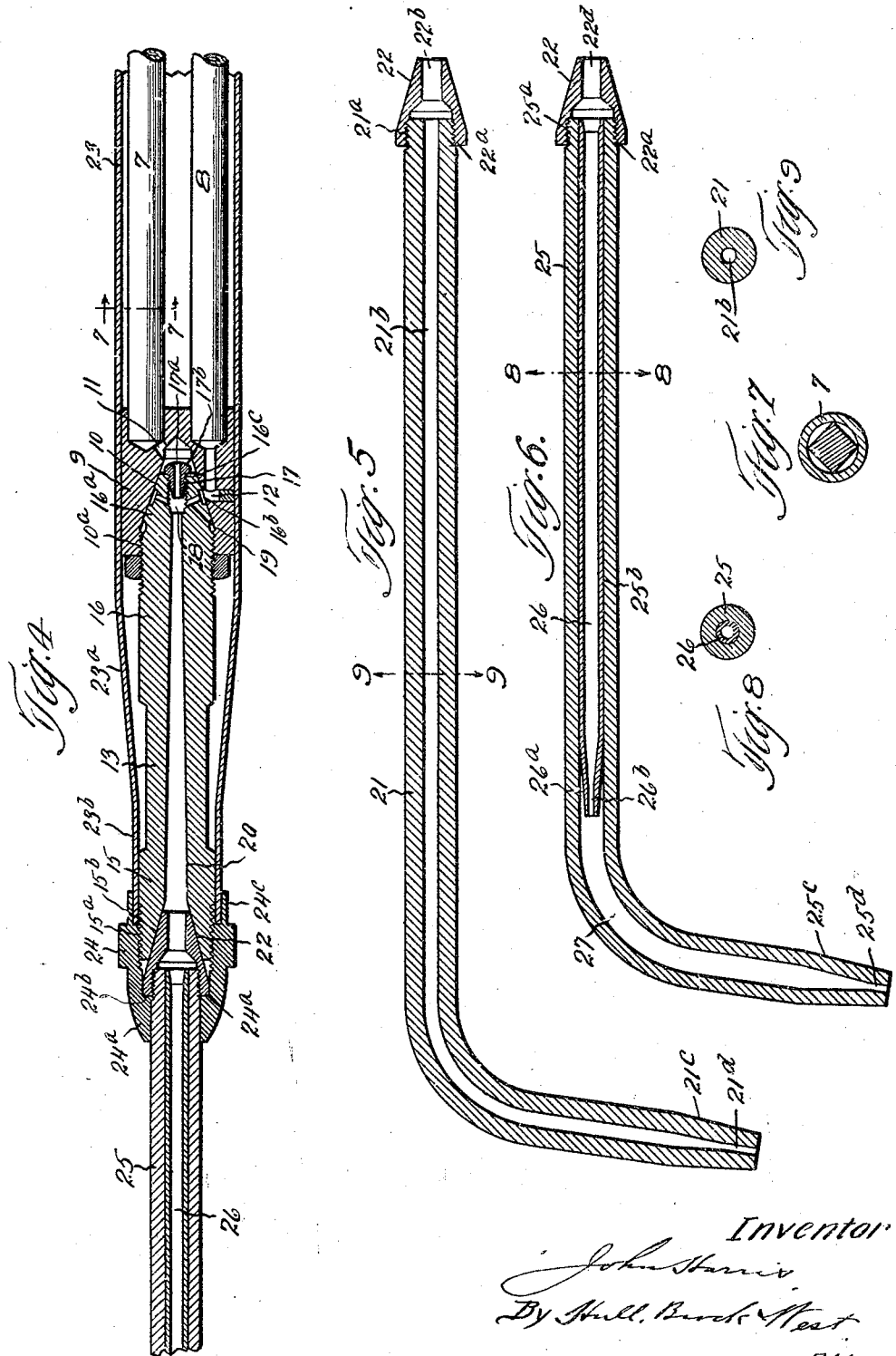
Inventor
John Harris
By Hull, Buck & West
Attys.

Patented Jan. 8, 1929.

1,698,094

UNITED STATES PATENT OFFICE.

JOHN HARRIS, OF CLEVELAND, OHIO, ASSIGNOR TO THE HARRIS CALORIFIC COMPANY, OF CLEVELAND, OHIO, A CORPORATION OF OHIO.

BLOWPIPE.

Application filed May 4, 1925. Serial No. 27,759.

This invention relates to blowpipes, and more particularly to blowpipes that are used for the purpose of welding metal. One of the objects of the invention is to provide a blowpipe which is capable of operating successfully with gas under a comparatively low pressure and with tips of varying capacity and which will prevent the propagation of flame therethrough into the valve block and the hose connected thereto.

A further object of the invention is to provide a blowpipe of this character with a mixing device which is capable of being conveniently connected to and disconnected from a head remote from the point of operation of the tip, which will enable tips of varying capacity to be quickly and conveniently attached thereto, and which is so constructed as to prevent the propagation of flame therethrough.

A still further object of the invention is to provide an improved construction of welding tip whereby the danger of the propagation of flame therethrough will be reduced to a minimum.

A still further object of the invention is to provide pipes of this character with an improved construction of handle and one which cooperates efficiently with the aforesaid mixing device and the means for connecting tips thereto.

I accomplish the foregoing objects in and through the construction and arrangement of parts shown in the drawings hereof, wherein Fig. 1 represents a side elevation of a blowpipe constructed in accordance with my invention; Figs. 2 and 3 represent, respectively, a plan view and a side elevation of the said pipe with the handle-casing broken away; Fig. 4 a detail in longitudinal section showing particularly the mixing device and the parts of the tip and handle associated therewith; Fig. 5 a longitudinal sectional view through a tip constructed in accordance with my invention; Fig. 6 a similar view through another form of such tip; and Figs. 7, 8 and 9 are details in section corresponding respectively to the lines 7—7 of Fig. 4, 8—8 of Fig. 5, and 9—9 of Fig. 6.

Describing the various parts by reference characters, 1 denotes a valve block having connections 2 and 3 for oxygen and a combustible gas, respectively, and provided with valves 4 and 5 for controlling the flow of such gases through said block. The block is provided at its front with a reduced threaded projection 6 into which are fitted the pipes 7 and 8 which conduct the oxygen and combustible gas from the valve block to the rear end of a block 9. This block is provided with a tapered or frusto-conical bore 10 merging at its front and enlarged end with a threaded cylindrical extension $10^a$ of such end. The pipe 7 communicates with the rear end of the bore 10 by means of a passage 11 while the pipe 8 communicates with an intermediate tapered portion of the bore 10 by means of a passage 12.

13 denotes the body of a mixing block, the said body being preferably of the shape shown herein and having a central portion 14 of reduced diameter and a front head portion 15 and a rear portion 16 of larger diameter. The rear portion 16 is of such diameter as to permit it to be threaded within the part $10^a$ of the bore, the end of the rear portion being frusto-conical in shape, as shown at $16^a$, whereby it is adapted to form a close fit with the bore 10. Intermediate of its ends, the part $16^a$ is provided with an annular recess $16^b$ which forms with the adjacent portion of the bore 10 an annular chamber into which the passage 12 is adapted to discharge. The rear end of the block 13 is provided with a short axial threaded bore $16^c$ into which is screwed a nipple 17 having a bore $17^a$ therethrough and provided at its rear with a head $17^b$ adapted to seat against the rear end of the part $16^a$. In front of the nipple 17 is a chamber 18 with which the passages 12 from the annular chamber 16 communicate, through ports 19.

The enlarged front head portion 15 of the block 13 is provided with a thread $15^a$ at its front end; and the head 15 is provided with a frusto-conical bore chamber $15^b$ extending rearwardly from the front thereof and communicating at its rear end with the central bore 20, said central bore being of gradually decreasing cross sectional area from the rear of the bore $15^b$ to the front of the chamber 18.

The tapered or frusto-conical bore chamber $15^b$ constitutes a seat for the ends of tips of various capacity, one of such tips being shown in detail in Fig. 5 and another in Fig. 6. The tip shown in Fig. 5 is a large-capacity tip and comprises a tube 21, preferably of copper, having its rear end threaded as shown at $21^a$ and having threaded thereon a frusto-conical connection 22 having a shoulder 22ª at its front end, the said connection being provided with a bore 22ᵇ extending forwardly from the rear end thereof, said bore adapted to deliver the gaseous mixture from the bore 20 into the central bore 21ᵇ of the tip. The tip is shown as bent adjacent to its front or delivery end and has its front end tapered, as shown at 21ᶜ, preferably by swaging. As this swaging operation reduces too much and tends to distort the delivery end of the bore 21ᵇ, the end of the pipe is drilled out to provide a central delivery port 21ᵈ of proper size, the rear end of the port merging with the bore 21ᵇ.

23 denotes a handle casing having its rear end threaded upon the forward extension 6 of the valve block 1. This handle casing is made of heavy tubing and is cylindrical in shape from the rear to and beyond the block 9, from which part it is tapered, as shown at 23ª, the front end of the handle being cylindrical, as shown at 23ᵇ, and being of a diameter to fit about and form a support for the front head 15 of the mixer block.

The tip is detachably connected to the mixer block by means of an ornamental sleeve nut 24 having a tapered front sleeve 24ª fitting about the rear end of the tip and provided with a shoulder 24ᵇ engaging the shoulder 22ª on the front end of the connection 22. The sleeve nut is threaded upon the front end of the mixer block and is provided with a cylindrical sleeve extension 24ᶜ which fits about and receives therewithin the front of the part 23ᵇ of the handle. The handle construction shown and described herein is not only ornamental in appearance, but engages and assists in supporting the block 9 and the front of the mixing block; it also cooperates with the sleeve nut 24 in providing an ornamental finish for the tip-connecting and supporting means.

In Fig. 6 there is shown one of the smaller-capacity tips which are adapted for use with my blowpipe. As pointed out hereinbefore, it is possible, through the construction of my mixing device, to operate a welding pipe satisfactorily with a gas pressure much lower than that usually employed; in fact I can operate such a pipe with a gas pressure only half that which is ordinarily employed—say 12½ pounds per square inch as distinguished from the ordinary operating pressure of about 25 pounds per square inch. In operating tips of smaller capacity under such low pressure, there is danger of reducing the velocity of gas therethrough to a point where "flash-back" will occur. While such "flash-back" is no more liable to occur in such tips than in other tips in general use, I construct my small-capacity tips in such manner as to prevent any injurious results from such occasional action. Referring to Fig. 6, it will be seen that the tube 25, of which the body of the small-capacity tip is composed, has fitted therein a tube 26, the said tube being inserted into the rear end of the bore of the tip and extending from such rear end preferably to a point adjacent to and at the rear of the bend in the body of the tip. The front end of the tube 26 is swaged to tapered shape, as indicated at 26ª, and such front end is provided with a delivery bore or orifice 26ᵇ of the same diameter as the delivery orifice 25ᵈ at the end of the tip. This provides a chamber 27 between the orifices 25ᵈ and 26ᵇ. In the event of the propagation of flame through the orifice 25ᵈ, due to the reduction in the velocity of the gases, the chamber 27 will accommodate such wave of propagation, and the flame will usually be extinguished in said chamber without passing through the orifice 26ᵇ, the wave being directed forwardly through the orifice 25ᵈ.

In the event of the propagation of flame through either of the tips shown herein into the mixing block, the tapered shape of the bore 20 of said block and the restricted bore 17ª will ordinarily extinguish the flame, the said bore effecting such a reduction in diameter in the wave of propagation as will result in extinguishing the flame and directing the wave forwardly. Finally, if a "back-fire" occurs which will pass entirely through the block 13 into the tube 7, the latter is provided with an angular filler block 7ª forming restricted passages 7ᵇ between itself and the tube and which restricted passages will serve as a final check against further propagation of flame toward the valve block 1 and the tubes connected thereto.

Among the advantages secured by my construction are the following:

a. Capability of operating with gas under low pressure, without injury from back-fire.

b. Providing for the efficient admixture of the gases supplied to the tips of welding pipes.

c. Employing in pipes of the character referred to a handle which cooperates in supporting the mixing device and in coupling detachable tips thereto.

d. Cheapness of production and efficiency in operation.

Having thus described my invention, what I claim is:

1. In a blow pipe, the combination of a mixing device, the said device having a bore therethrough, the rear end of said bore being restricted in cross sectional area to prevent propagation of flame therethrough and the said bore increasing in cross sectional area from such rear end approximately to the front thereof, pipes for supplying oxygen and a combustible gas through the bore of said mixing device, the oxygen pipe having means for preventing the propagation of flame therethrough, and a tip connected to the delivery end of the said mixing device, the said tip having a bore therethrough, the front or delivery end of said bore being restricted to form a delivery orifice for the mixture of oxygen and combustible gas and the said tip having an intermediate portion of the bore thereof restricted to substantially the diameter of the orifice at the front or delivery end of said tip, there being an expansion chamber formed between the two restricted portions of the bore of said tip.

2. In a blow pipe, the combination of a mixing device, the said device having a bore therethrough, the said bore being restricted in cross sectional area to prevent propagation of the flame therethrough, pipes for supplying oxygen and a combustible gas through the bore of said mixing device, the oxygen pipe having its bore restricted to prevent propagation of flame therethrough, and a tip connected to the delivery end of the said mixing block, the said tip having a bore therethrough, the front or delivery end of said bore being restricted to form a delivery orifice for the mixture of oxygen and combustible gas and the said tip having an intermediate portion of the bore thereof restricted to substantially the diameter of the orifice at the front or delivery end of said tip, there being an expansion chamber formed between the two restricted portions of the bore of said tip.

3. In a blow pipe, the combination of a mixing device having a mixing bore therethrough, a pipe for supplying oxygen and a pipe for supplying combustible gas to said bore, the oxygen pipe having means therein for preventing the propagation of flame therethrough from said mixing device and the said mixing device having means for checking the propagation of flame therethrough, and a tip connected to said device and also provided with means for checking the propagation of flame therethrough.

4. In a blow pipe, the combination of a block having connections for supplying oxygen and a combustible gas thereto, a mixing block connected to the first mentioned block and extending forwardly therefrom, the said mixing block having an elongated bore therethrough, the rear end of said bore being restricted in cross sectional area and receiving oxygen from the first block, the bore in front of such restricted portion being enlarged and receiving combustible gas from such first block, the said bore increasing in cross-sectional area from such enlarged part to the front or delivery end thereof, a tip, and means for securing the said tip to the front or delivery end of the said mixing block.

5. In a blow pipe, the combination of a block having passages for oxygen and a combustible gas and means for supplying such gases respectively to such passages, a mixing device detachably connected to said block and having at its rear end a nipple provided with a restricted bore and provided in front of said nipple with a chamber and with a central bore extending forwardly from said chamber, the said central bore being of gradually increasing cross sectional area from the rear to the front or delivery end thereof, means for delivering oxygen from the passage therefor in said block through the bore of said nipple, means for delivering combustible gas from the passage therefor in said block to the chamber in front of said nipple, a tip, and means for detachably connecting the said tip to the front of said mixing device.

6. In a blow pipe, the combination of a mixing block, a tip, and means for securing the said tip to the said block, the said block having a bore extending from the rear portion to the front portion thereof, said bore being of gradually increasing cross sectional area from the rear portion thereof to the front portion thereof, the said block being provided with restricted passages extending from the rear portion of said bore and supplying oxygen and a combustible gas thereto, said restricted passages preventing the propagation of flame from the bore of the mixing block into the sources of supply for oxygen and combustible gas.

7. A welding tip adapted to be attached to the mixture-containing portion of a blow pipe, the said tip comprising a continuous elongated body having a bore therethrough, the said bore including an expansion chamber in the front portion of the tip, a portion of restricted cross-sectional area communicating with the rear of said chamber and a delivery portion of restricted cross-sectional area communicating with the front of said chamber.

8. A welding tip adapted to be attached to the mixture-containing portion of a blow pipe, the said tip comprising a continuous elongated body having a bore therethrough, the said bore including an expansion chamber in the front portion of the tip, a portion of restricted cross-sectional area communicating with the rear of said chamber and a portion of restricted cross-sectional area communicating with the front of said chamber, the restricted portions of the bore being of substantially the same cross-sectional area.

9. A welding tip adapted to be attached to a mixture-containing part of a blowpipe, said tip comprising an elongated continuous body having a bore or passage extending therethrough, the front or delivery end of said bore being restricted to define a discharge outlet, and a tube inserted in the rear end of said bore and having a restricted bore or passage at the front thereof for delivering a gaseous mixture to the enlarged portion of the tip-bore which is at the rear of the discharge outlet of said tip.

10. A welding tip adapted to be attached to a mixture-containing part of a blowpipe, said tip comprising an elongated continuous body having a bore or passage extending therethrough, the front or delivery end of said bore being restricted to define a discharge outlet, and a tube inserted in the rear end of said bore and having a restricted discharge outlet at the front thereof for delivering a gaseous mixture to the enlarged portion of the tip bore, the said discharge outlets being of substantially the same cross-sectional area.

11. In a blow pipe, the combination of a valve block having means for supplying gases thereto and passages for such gases therein, tubes communicating with said passages and extending forwardly from said block, a block with which the delivery ends of said tubes are connected and having passages for the gases so delivered, a mixing device extending forwardly from the second block and having a head, a tubular handle fitted to the valve block and extending about and engaging the second block and projecting beyond the second block to the front of the mixing device and having its front portion engaging the head on said device, a tip, and means detachably securing the said tip to the said head and having a rearwardly extending sleeve adapted to extend over the front end of the said handle.

12. In a blow pipe, the combination of a valve block having means for supplying gases thereto and passages for such gases therein, tubes communicating with said passages and extending forwardly from said block, a mixing device with which the delivery ends of said tubes communicate and extending forwardly from said tubes, said mixing device having a head, a tubular handle supported at its rear end by said block and extending forwardly about said tubes and the said device and having its front end surrounding and supporting the said head, a tip, and a sleeve nut for securing the said tip to the said head, the said nut having a rearwardly extending sleeve extending over the front end of the said handle.

13. In a blow pipe, the combination of a valve block having means for supplying gases thereto and passages for such gases therein, pipes communicating with said passages and extending forwardly from said block, a mixing device with which the delivery ends of said pipes communicate and extending forwardly from said pipes, said mixing device being formed at its front end into a head, a tubular handle supported at its rear end by said block and extending forwardly about said pipes and the said device and having its front end surrounding and supporting the said head, a tip, and means engaging the front of said handle for securing the said tip to the said head.

14. In a blow pipe, the combination of a valve block having means for supplying gases thereto and passages for such gases therein, tubes communicating with said passages and extending forwardly from said block, a cylindrical block with which the delivery ends of said tubes are connected and having passages for the gases so delivered, a mixing device extending forwardly from the second block and having a cylindrical head at its front end, a tubular handle threaded on the valve block and extending about and engaging the second block and projecting beyond the second block and having a reduced cylindrical front end adapted to fit about the said head, a tip, and a nut threaded on the said head and having a tapered forwardly projecting sleeve arranged to engage the said tip and force the same to a seat therefor carried by said head, the said nut having a rearwardly projecting sleeve adapted to overlap and cover the front end of the said handle.

15. In a blow pipe, the combination of a cylindrical head having means for supplying a mixture of oxygen and a combustible gas thereto, the said head being provided with an external thread at the front end thereof and with a chamber at the delivery end thereof, a tip having at its rear end a connection adapted to be received within the said chamber and a shoulder, a nut adapted to be threaded upon the said head and having a sleeve surrounding the aforesaid part of the tip and a shoulder adapted to engage the first mentioned shoulder, and a tubular handle having a cylindrical front end fitting about the said head, the said nut having a rearwardly extending sleeve adapted to fit about the front end of said handle.

16. In a blow pipe, the combination of a cylindrical head having means for supplying a mixture of oxygen and a combustible gas thereto, the said head being provided with an external thread at the front end thereof, a tip having a projection at its rear end, a nut having a shoulder adapted to engage said projection, said nut being adapted to be threaded upon the said head to secure the tip thereto, and a tubular handle having a cylindrical front end fitting about the said head, the said nut having a rearwardly extending sleeve adapted to fit about the front end of said handle.

17. In a blow pipe, the combination of a block having a forwardly flaring chamber therein and connections for supplying oxygen to the rear portion of said chamber and a combustible gas to an intermediate portion of said chamber, a mixing device having a tapered rear end adapted to seat against the tapered wall of said chamber and having a bore extending therethrough, a nipple having a bore therethrough and threaded into the rear portion of the first-mentioned bore, there being one or more ports extending through the tapered portion of the said mixing device and adapted to receive combustible gas supplied to said block and to deliver the same in front of the bore of said nipple, means for securing the mixing device to the said block, and means for detachably connecting a tip to the forward end of the said device.

18. In a blow pipe, the combination of a block having means for supplying gases thereto and passages therein for said gases, tubes communicating with said passages and extending forwardly from said block, a second block to which the delivery ends of the said tubes are connected, the second block having a forwardly flaring chamber therein and passages for conducting the gases delivered by the tubes to the rear of said chamber and to an intermediate portion of said chamber, a mixing device having a tapered rear end adapted to be fitted against the flaring wall of said chamber and having a bore therethrough, a nipple having a bore therethrough threaded into the rear end of the first mentioned bore, there being one or more ports extending outwardly from the mixing device bore in front of said nipple and through the said device, means for securing the said mixing device to the second block with the nipple bore and the ports communicating respectively with the rear portion of the chamber of the second block and with the portion of said chamber with which the intermediate passages in such block communicate, a tip, and means for detachably securing the said tip to the front end of the mixing device.

19. In a blow pipe, the combination of a block having means for supplying gases thereto and passages therein for said gases, tubes communicating with said passages and extending forwardly from said block, a second block with which the delivery ends of the said tubes are connected, the second block having a forwardly flaring chamber therein, a mixing device having a tapered rear end adapted to be fitted against the flaring wall of said chamber and having a bore therethrough, a nipple having a bore therethrough threaded into the rear end of the first mentioned bore, the tapered portion of the said device having an annular groove therearound and one or more ports extending inwardly from said groove to the bore of said device in front of said nipple, means for securing the said mixing device to the second block, the second block having passages for delivering oxygen to the rear portion of the chamber thereof and for delivering combustible gas to the portion of said chamber which registers with the said groove, a tip, and means for detachably securing the said tip to the front end of the mixing device.

In testimony whereof, I hereunto affix my signature.

JOHN HARRIS.